United States Patent
Kumagai et al.

(10) Patent No.: US 7,021,652 B2
(45) Date of Patent: Apr. 4, 2006

(54) AIRBAG APPARATUS

(75) Inventors: Masayoshi Kumagai, Shiga (JP); Akifumi Taketomi, Yokaichi (JP); Tadashi Tanaka, Asaka (JP); Takeshi Kurimoto, Shiga (JP)

(73) Assignee: Takata Corporation, Tokyo (JP)

( * ) Notice: Subject to any disclaimer, the term of this patent is extended or adjusted under 35 U.S.C. 154(b) by 29 days.

(21) Appl. No.: 10/356,484

(22) Filed: Feb. 3, 2003

(65) Prior Publication Data

US 2003/0160433 A1      Aug. 28, 2003

(30) Foreign Application Priority Data

Feb. 25, 2002    (JP) .............................. 2002-048175

(51) Int. Cl.
*B60R 21/24*    (2006.01)
*B60R 21/26*    (2006.01)

(52) U.S. Cl. ................... 280/729; 280/730.2; 280/740; 280/741; 280/742

(58) Field of Classification Search ............... 280/729, 280/740, 741, 742, 730.2
See application file for complete search history.

(56) References Cited

U.S. PATENT DOCUMENTS

| | | | |
|---|---|---|---|
| 3,767,225 A * | 10/1973 | Mazelsky | ................... 280/729 |
| 5,556,128 A | 9/1996 | Sinnhuber et al. | |
| 5,803,485 A | 9/1998 | Acker et al. | |
| 5,934,701 A * | 8/1999 | Furukawa | ................ 280/730.1 |
| 6,062,143 A | 5/2000 | Grace et al. | |
| 6,220,624 B1 * | 4/2001 | Abraham et al. | ........ 280/728.2 |
| 6,276,716 B1 * | 8/2001 | Kato | .......................... 280/735 |
| 6,293,581 B1 * | 9/2001 | Saita et al. | .............. 280/730.2 |
| 6,334,625 B1 * | 1/2002 | Pausch et al. | ............. 280/729 |
| 6,349,964 B1 * | 2/2002 | Acker et al. | ............. 280/730.2 |
| 6,378,895 B1 | 4/2002 | Brucker et al. | |
| 6,601,871 B1 | 8/2003 | Fischer | |
| 6,616,177 B1 * | 9/2003 | Thomas et al. | ............. 280/729 |
| 6,702,320 B1 * | 3/2004 | Lang et al. | ................ 280/729 |

FOREIGN PATENT DOCUMENTS

JP        2000-177527       * 6/2000

* cited by examiner

*Primary Examiner*—Eric Culbreth
(74) *Attorney, Agent, or Firm*—Manabu Kanesaka

(57) ABSTRACT

An airbag apparatus includes an airbag having an interior divided into a plurality of chambers, and a gas generator for inflating the airbag so that gas is guided directly to each chamber from the gas generator. Further, a gas distributor having a plurality of gas outlets is attached to a gas outlet of the gas generator. The gas is supplied to the respective chambers through the gas outlets of the gas distributor.

11 Claims, 2 Drawing Sheets

AIRBAG APPARATUS

BACKGROUND OF THE ART AND RELATED ART STATEMENT

The present invention relates to an airbag apparatus for protecting an occupant in a vehicle or the like, and more specifically, it relates to an airbag apparatus including an airbag having an interior divided into a plurality of chambers.

As well known, in an airbag apparatus, an airbag is inflated with a gas generator to receive an occupant's body with the inflated airbag.

It has been known that some types of the airbags have an arrangement in which an interior of the airbag is divided into a plurality of chambers. In such an airbag, gas is supplied from a gas generator to one of the chambers to inflate the one chamber first, and then the gas passing through the one chamber flows into the other chambers to inflate the same, so that the one chamber where an occupant abuts first is inflated prior to the other chambers.

An object of the present invention is to provide an airbag apparatus in which gas from a gas generator is directly supplied to each chamber of an airbag.

Further objects and advantages of the invention will be apparent from the following description of the invention.

SUMMARY OF THE INVENTION

In an airbag apparatus according to the present invention, an airbag apparatus includes an airbag having an interior divided into a plurality of chambers, and a gas generator for inflating the airbag so that gas is guided directly to each chamber from the common gas generator.

The gas distributor 4 includes two gas outlets 4a and 4b. The first gas outlet 4a is oriented in a direction substantially same as a direction that a central axis of the cylindrical gas generator 3 extends toward the one end. The second gas outlet 4b is oriented in a direction substantially perpendicular to the central axis.

The first gas outlet 4a has a diameter larger than that of the second gas outlet 4b. The first gas outlet 4a is inserted in the first chamber 1a and the second gas outlet 4b is inserted in the second chamber 1b, as shown in FIG. 2(a).

In this case, a size of the gas outlet of the gas distributor may be designed depending on inflation characteristics of each chamber, thereby making it easy to obtain the desired amount and pressure of the gas supplied to each chamber.

BRIEF DESCRIPTION OF THE DRAWINGS

FIGS. 2(a) and 2(b) are sectional views showing an airbag, wherein FIG. 2(a) is a sectional view taken along line 2(a)—2(a) in FIG. 1, and FIG. 2(b) is a sectional view taken along line 2(b)—2(b) in FIG. 2(a);

DETAILED DESCRIPTION OF PREFERRED EMBODIMENTS

Figure 1:
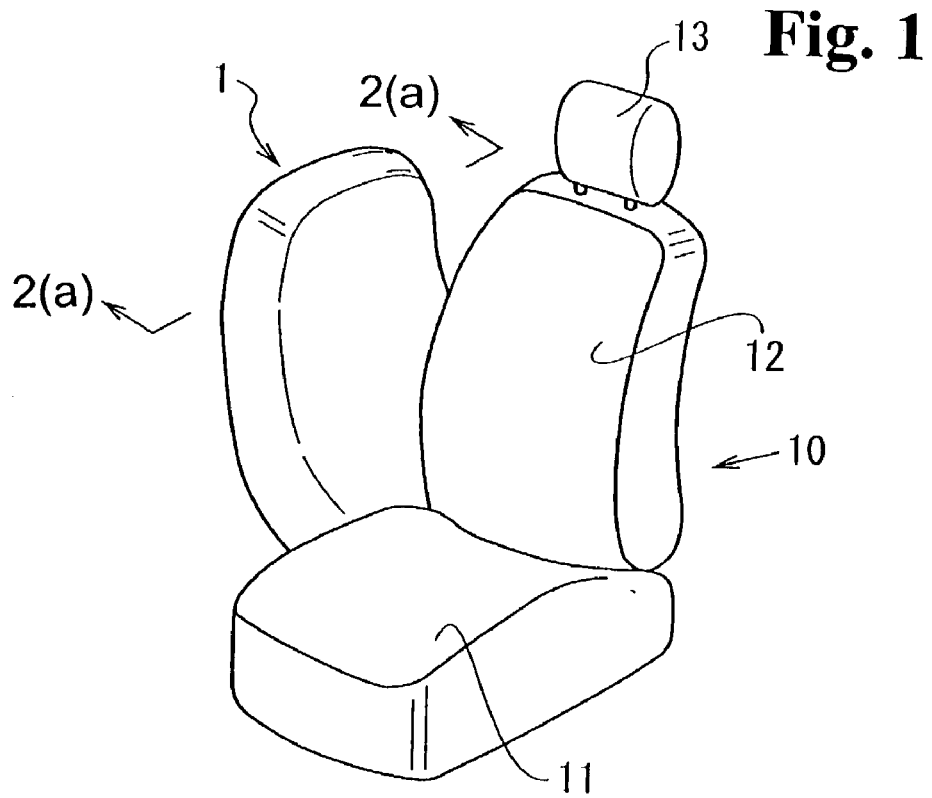
FIG. 1 is a perspective view showing a vehicle seat having a side airbag apparatus according to an embodiment of the invention.
Figure 2A:
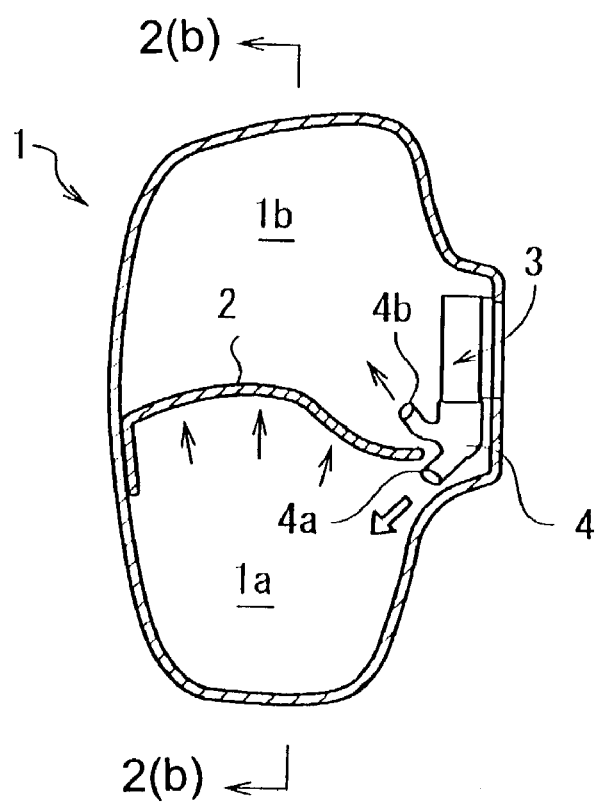
Figure 2B:
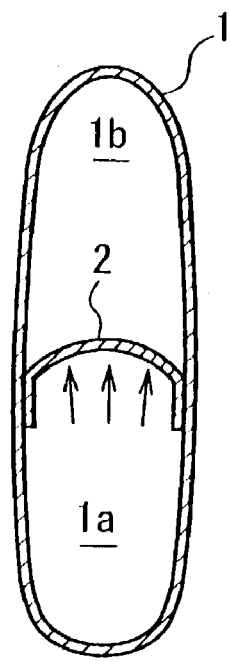
Figure 3:
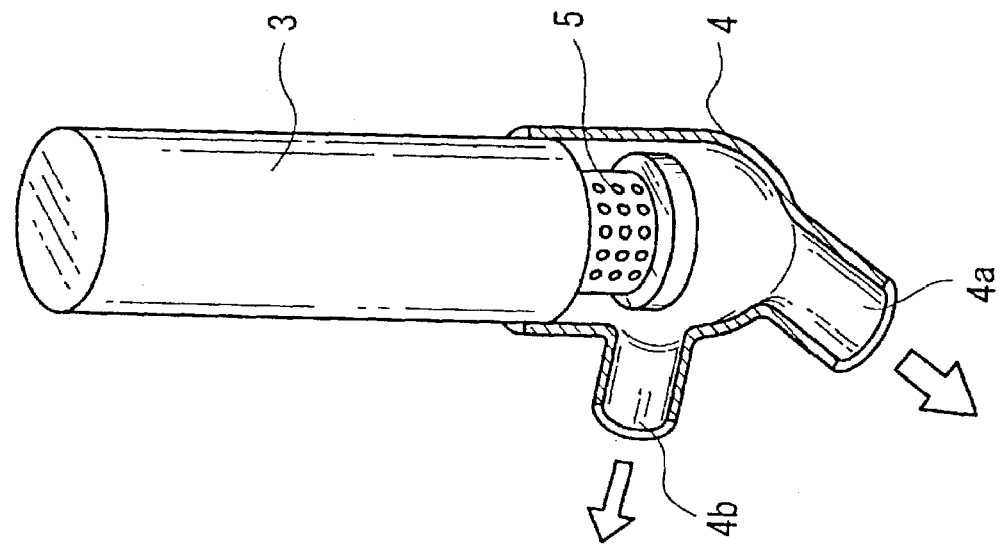
FIG. 3 is a perspective view of a gas generator and a gas distributor.
Figure 4:
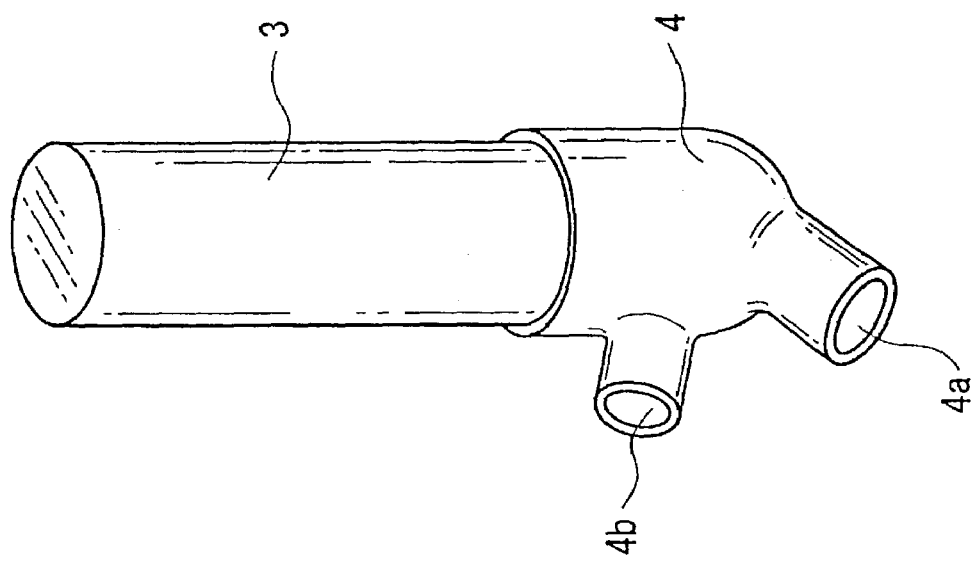
FIG. 4 is a partially sectional perspective view of the gas generator and the gas distributor.

Hereunder, embodiments of the present invention will be described with reference to the accompanying drawings. FIG. 1 is a perspective view of a vehicle seat having a side airbag apparatus serving as an airbag apparatus according to an embodiment; FIG. 2(a) is a sectional view taken along line 2(a)—2(a) in FIG. 1; FIG. 2(b) is a sectional view taken along line 2(b)—2(b) in FIG. 2(a); FIG. 3 is a perspective view of a gas generator and a gas distributor; and FIG. 4 is a partially sectional perspective view of the gas generator and the gas distributor.

As shown in FIG. 1, a side airbag 1 is constructed so as to inflate along a window side portion of a seat 10. The seat 10 includes a seat cushion 11, a seat back 12, and a headrest 13.

The seat back 12 has a casing (not shown) of the side airbag apparatus mounted on a side thereof. The folded side airbag 1 is housed in the casing and the casing is covered with a module cover (not shown).

The side airbag 1 is formed of a sheet-like material such as cloth and a plastic sheet formed in a bag shape, wherein an interior is divided into a lower first chamber 1a and an upper second chamber 1b with a partition panel 2 extending substantially horizontally inside the bag. The first chamber 1a and the second chamber 1b are not substantially communicated with each other.

In this embodiment, the side airbag 1 includes a gas generator 3 therein. A holder (not shown) supports the gas generator 3, and the holder is fixed to the casing together with the side airbag 1. In other words, a back surface of the side airbag 1 is interposed between the holder and the casing, and the back surface of the side airbag 1 is fastened to the casing with bolts or rivets, so that the back surface of the side airbag 1 is fixed to the casing together.

The gas generator 3 is provided with a gas distributor 4. In this embodiment, as shown in FIGS. 3 and 4, the gas generator 3 has a substantially cylindrical shape, one end of which is provided with gas jets or outlets 5. The gas distributor 4 formed in a substantially hemispherical shell is fastened to the gas generator 3 so as to surround the gas outlets 5. The gas distributor 4 is firmly fastened to the gas generator 3 by press fitting or welding.

The gas distributor 4 includes two gas outlets 4a and 4b. The first gas outlet 4a is oriented in a direction substantially the same as a direction that a central axis of the cylindrical gas generator 3 extends toward the one end. The second gas outlet 4b is oriented in a direction substantially perpendicular to the central axis.

The first gas outlet 4a has a diameter larger than that of the second gas outlet 4b. The first gas outlet 4a is inserted in the first chamber 1a and the second gas outlet 4b is inserted in the second chamber 1b, as shown in FIG. 2.

In the side airbag apparatus with such a configuration, in an event of a side collision or an overturning of the vehicle, the gas generator 3 emits the gas. The gas is emitted from the gas outlets 5 and flows into the first chamber 1a and the second chamber 1b through the gas outlets 4a and 4b of the gas distributor 4, respectively, to inflate the chambers 1a and 1b. Thus, the airbag 1 is deployed along the window side of the seat 10, as shown in FIG. 1. In this case, the first gas outlet 4a has a diameter larger than that the second gas outlet 4b. Therefore, the gas is supplied to the first chamber 1a in a larger quantity at a higher pressure than that supplied to the second chamber 1b. Consequently, the first chamber 1a is inflated at a higher internal pressure to receive a waist of an occupant moving laterally. The second chamber 1b is inflated at an internal pressure lower than that of the first chamber 1a, which is preferable for softly receiving a right upper half of the occupant body.

In this embodiment, the gas generator 3 can be one widely available, and the gas distributor 4 is fitted to the gas generator, so that a cost is low. Also, sizes of the gas outlets 4a and 4b of the gas distributor 4 can be designed depending on a desired internal pressure of the chambers 1a and 1b.

In the above embodiment, since the first chamber 1a provides a high pressure, the sheet-like material for surrounding the first chamber 1a may be formed of a material with high air-tightness, i.e. no air permeability. Also, a joining section (for example, a seam) of the sheet-like material for forming the first chamber 1a maybe formed air-tightly.

In the embodiment, the side airbag 1 is divided into the two chambers. However, it may be divided into three or more chambers and the gas distributor 4 may include three or more gas outlets.

The gas distributor 4 can be formed of metal, a synthetic resin, or ceramic. However, the gas distributor may be made of cloth in this invention.

In the aforementioned embodiment, the gas generator is formed in a cylindrical shape. However, the gas generator may have various shapes, such as a disc. The present invention can be applied to various types of airbag apparatus other than the side airbag apparatus.

As described above, according to the present invention, when the airbag with the divided chambers is inflated, the pressure can individually be adjusted.

While the invention has been explained with reference to the specific embodiments, the explanation is illustrative and the invention is limited only by the appended claims.

What is claimed is:

1. An airbag apparatus for protecting an occupant in a vehicle, comprising:
    an airbag having a plurality of divided chambers therein;
    a gas generator attached to the airbag for inflating the same; and
    a gas distributor attached to the gas generator for directly supplying gas to each of the plurality of the chambers, said gas distributor covering only a lower part of the gas generator and having one gas outlet at a bottom thereof oriented downwardly to eject the gas downwardly and another gas outlet at a side thereof oriented laterally to eject the gas laterally so that said gas generator supplies the gas to each of the plurality of the chambers through each of the gas outlets of the gas distributor.

2. An airbag apparatus according to claim 1, wherein said gas outlets of the gas distributor have dimensions adjusted according to inflation characteristics of each of the plurality of the chambers.

3. An airbag apparatus according to claim 1, wherein said gas outlets of the gas distributor have different dimensions so that each of the plurality of the chambers has a predetermined internal pressure when the airbag is inflated.

4. An airbag apparatus according to claim 3, wherein said airbag has a partition panel extending substantially horizontally therein to substantially completely divide the airbag into two chambers when the airbag is inflated, each of said gas outlets being connected to the divided chambers.

5. An airbag apparatus according to claim 4, wherein said gas generator is located inside the airbag.

6. An airbag apparatus according to claim 1, wherein said one and another gas outlets have portions branching outwardly from a portion covering the gas generator.

7. An airbag apparatus according to claim 1, wherein said gas outlets are located at least inside the divided chambers.

8. An airbag apparatus according to claim 1, wherein said gas distributor has a cylindrical shape covering only the lower part of the gas generator.

9. An airbag apparatus according to claim 8, wherein said gas distributor is made of cloth.

10. An airbag apparatus according to claim 8, wherein said airbag has a partition panel extending substantially horizontally therein to substantially completely divide the airbag into upper and lower chambers when the airbag is inflated, said gas generator being located inside the upper chamber.

11. An airbag apparatus according to claim 10, wherein said one gas outlet projects from the gas distributor and is located in the lower chamber, and said another gas outlet ejects gas in the upper chamber.

* * * * *